UNITED STATES PATENT OFFICE.

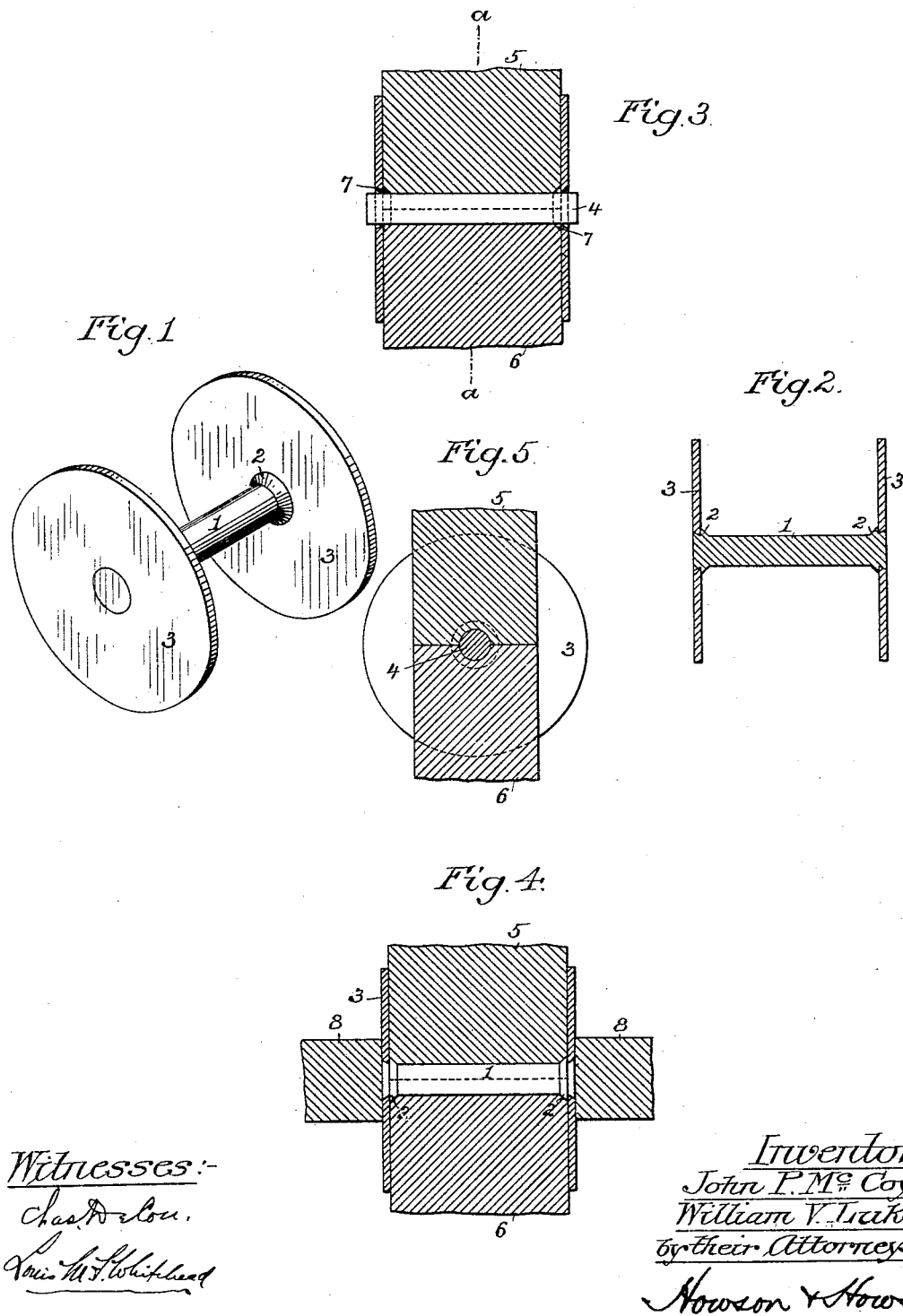

JOHN P. McCOY AND WILLIAM V. LUKENS, OF PHILADELPHIA, PENNSYLVANIA.

CHAPLET.

SPECIFICATION forming part of Letters Patent No. 713,571, dated November 11, 1902.

Application filed August 20, 1900. Serial No. 27,478. (No model.)

*To all whom it may concern:*

Be it known that we, JOHN P. McCOY and WILLIAM V. LUKENS, citizens of the United States, residing in Philadelphia, Pennsylvania, have invented certain Improvements in Chaplets, of which the following is a specification.

Our invention relates to that class of chaplets which consist of a stem having a disk or plate at either or both ends, the object of our invention being to cheapen and expedite the manufacture of core-anchors of this class.

In the accompanying drawings, Figure 1 is a perspective view of a chaplet constructed in accordance with our invention. Fig. 2 is a sectional view of the same. Figs. 3 and 4 are longitudinal sections illustrating successive steps in the manufacture of chaplets in accordance with our invention; and Fig. 5 is a transverse section on the line *a a*, Fig. 3.

Chaplets such as that to which our invention relates usually consist of a central stem or bar, with disks or plates secured to the opposite ends of the same, and the usual method of manufacture is to form in each disk an opening less in diameter than that of the connecting rod or bar, the latter being turned down at the ends and the reduced portions being passed through openings in the disks and riveted down on the outer sides of the latter. In our improved chaplet, however, the rod or bar 1 has enlarged flanges or collars 2 near each end, forming shoulders, against which bear the end disks or plates 3, the openings in the latter being of the same or even of greater diameter than the rod or bar 1 and being preferably beveled or undercut for the reception of the riveted ends of the bar.

In making our improved chaplet we first take a rod 4 of the required diameter and of a length somewhat greater than the distance between the outer faces of the end disks or plates 3 in the finished chaplet, and this rod we firmly confine between upper and lower dies 5 and 6, constructed to surround and grip the rod and having at the opposite ends of their meeting portions recesses 7 of the shape desired for the projecting flanges or collars 2 on the connecting-rod of the chaplet. The rod 4 being thus held, the disks or plates 3 are slipped upon the projecting ends of the same, as shown in Fig. 3, and are then subjected to the action of a pair of hammers 8, as shown in Fig. 4, the effect of which is to cause them to expand and fill the recesses 7 in the dies 5 and 6 and also the openings in the disks or plates 3, which openings are undercut, so that the ends of the rod may be pressed down flush with the outer faces of the disks or plates, although this construction is not absolutely necessary, since it is manifest that the ends of the rods can be riveted down on the outer faces of the disks or plates, if desired.

By means of our invention the bearing-shoulders for the disks or plates are formed simultaneously with the riveting of the ends of the rod. Hence the operation can be very quickly and cheaply effected and the chaplets can be produced at a much lower cost than usual and bearing flanges or collars of any desired size may be formed upon the rod 1, a result which is not possible when the shoulders are formed by turning down the ends of the rod, as usual.

Our invention can, as will be evident, be adopted in the manufacture of a chaplet having a plate or disk at one end of the rod only instead of at both ends.

Having thus described our invention, we claim and desire to secure by Letters Patent—

1. A chaplet consisting of a rod or bar and a plate or disk confined between a flange on the bar and a riveted portion of the end of the bar contained in a countersunk opening in said plate, both the said riveted portion and flange of the bar being of greater diameter than the bar itself and both formed by the same operation, substantially as specified.

2. A chaplet consisting of a rod or bar having a plate or disk at each end, each plate or disk being confined between a flange on the bar and a riveted portion of end of the bar, the opening in each disk or plate being of the full diameter of the bar, and both of the flange and riveted portions of the bar being of greater diameter than the same and formed by the same operation, substantially as specified.

3. A chaplet consisting of a rod or bar having at each end a disk or plate with countersunk opening therein, said disk or plate being secured between a flange on the bar and a riveted portion of the end of the bar contained within the countersunk opening of the plate and both of said portions formed by the same operation, substantially as specified.

In testimony whereof we have signed our names to this specification in the presence of two subscribing witnesses.

JOHN P. McCOY.
WM. V. LUKENS.

Witnesses:
WILLIAM DE KRAFFT,
FRED WOOLLNER.